Nov. 2, 1954  R. BAY  2,693,155
DOUGH DEPOSITOR FOR DOUGH ROUNDERS
Filed Dec. 9, 1948  5 Sheets-Sheet 1
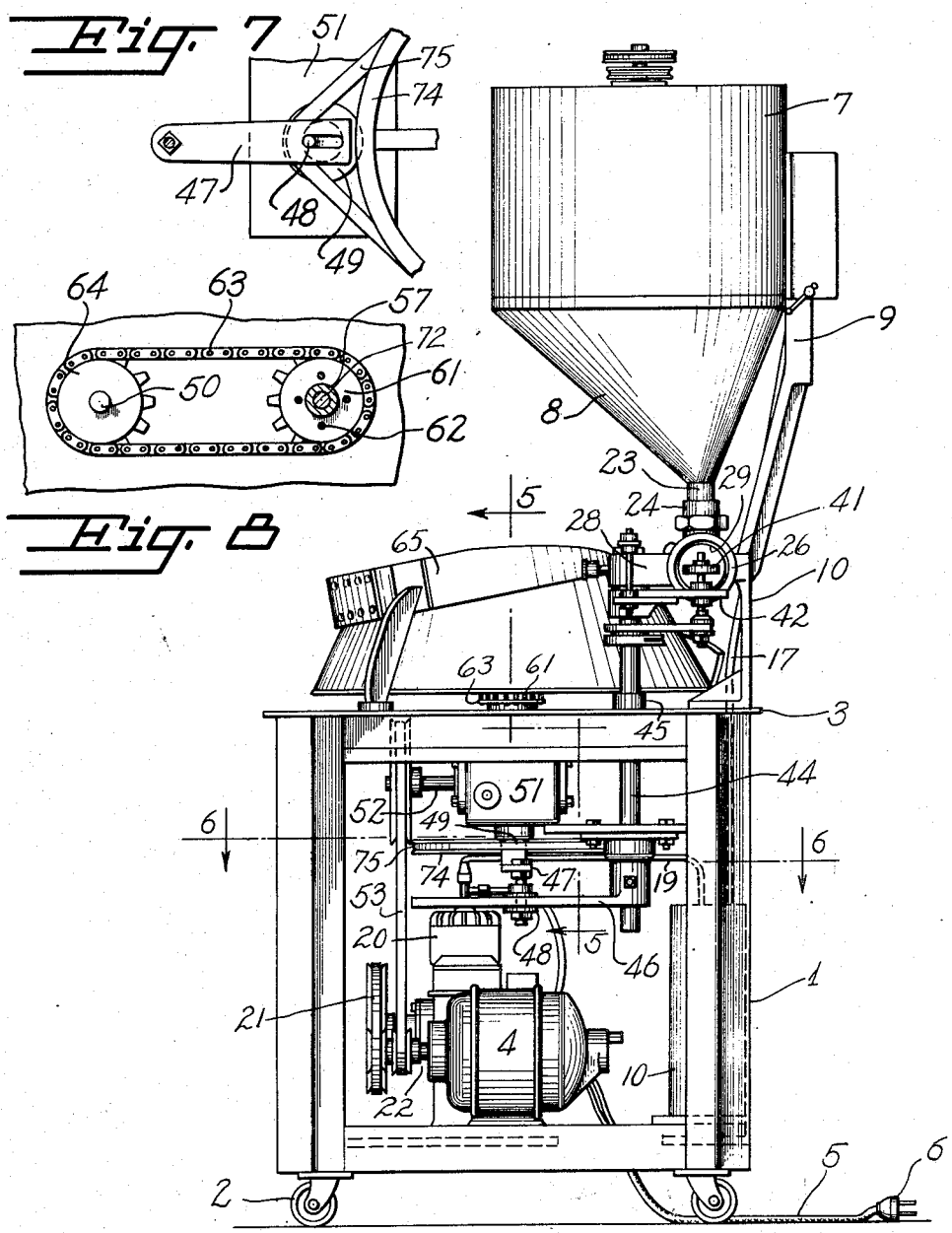
INVENTOR.
Raymond Bay
BY Victor J. Evans & Co.
ATTORNEYS Nov. 2, 1954 R. BAY 2,693,155
DOUGH DEPOSITOR FOR DOUGH ROUNDERS
Filed Dec. 9, 1948 5 Sheets-Sheet 2
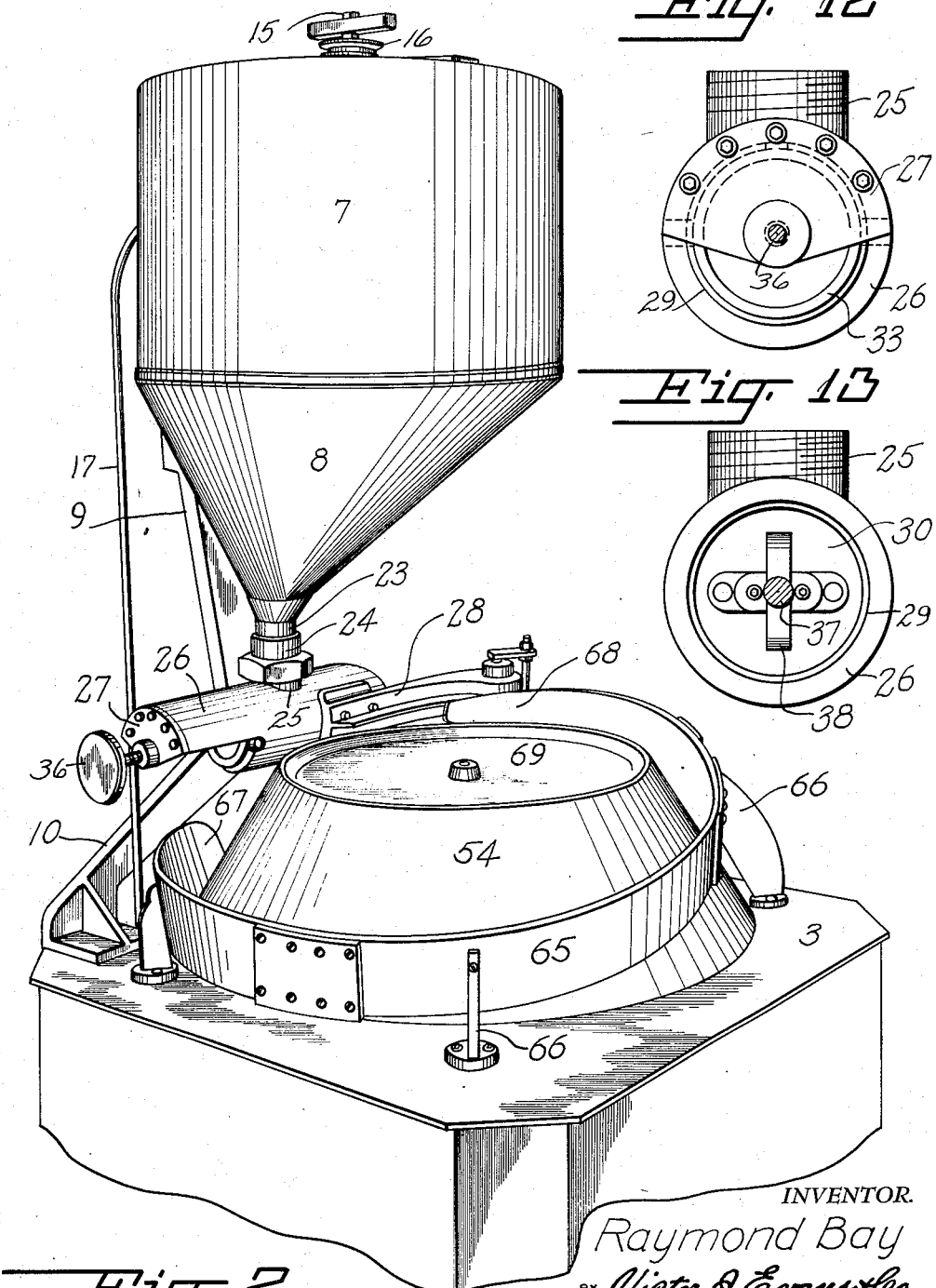
INVENTOR.
Raymond Bay
BY Victor J. Evans & Co.
ATTORNEYS Nov. 2, 1954 R. BAY 2,693,155
DOUGH DEPOSITOR FOR DOUGH ROUNDERS
Filed Dec. 9, 1948 5 Sheets-Sheet 3
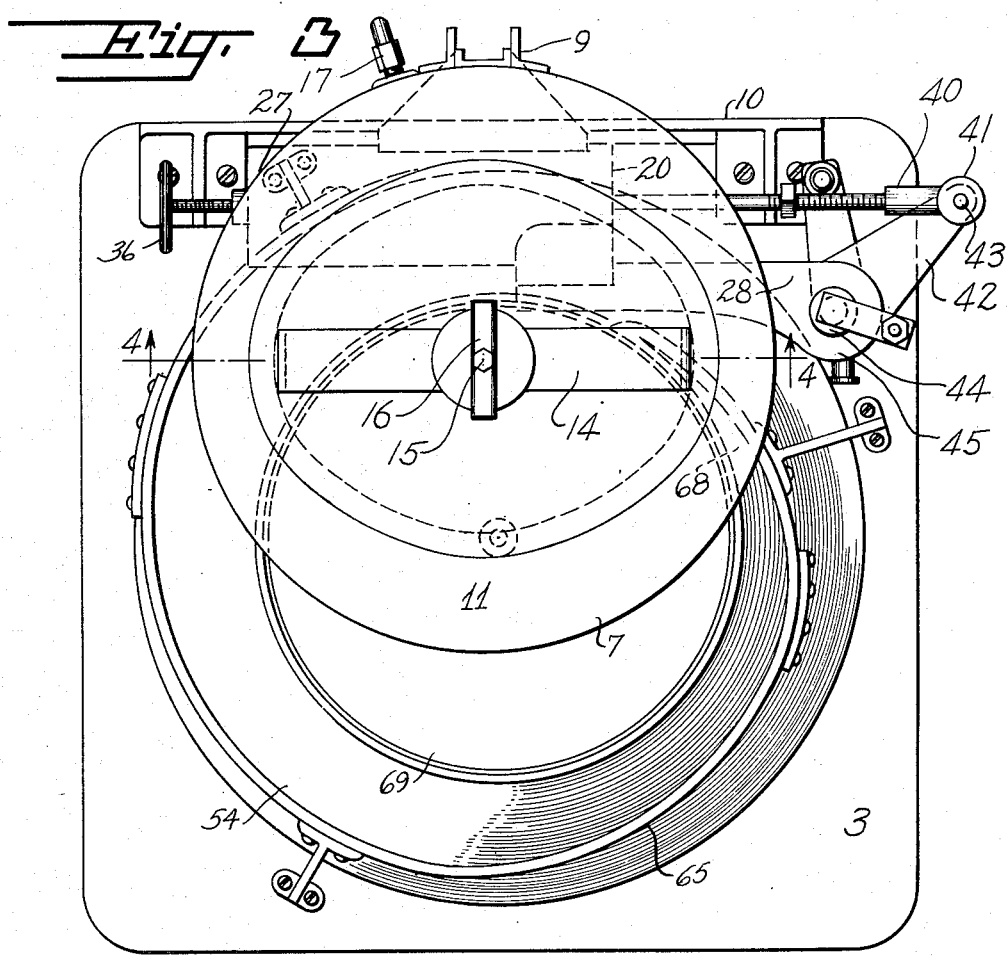
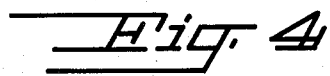
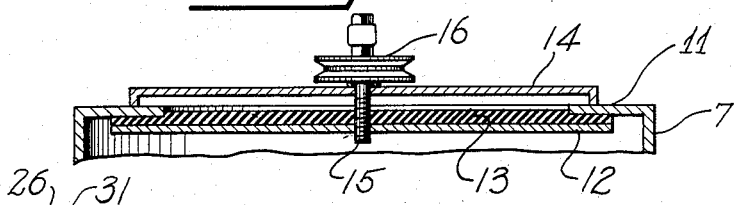
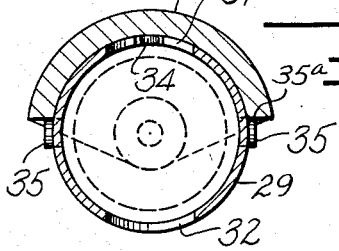
INVENTOR.
Raymond Bay
BY *Victor J. Evans & Co.*
ATTORNEYS

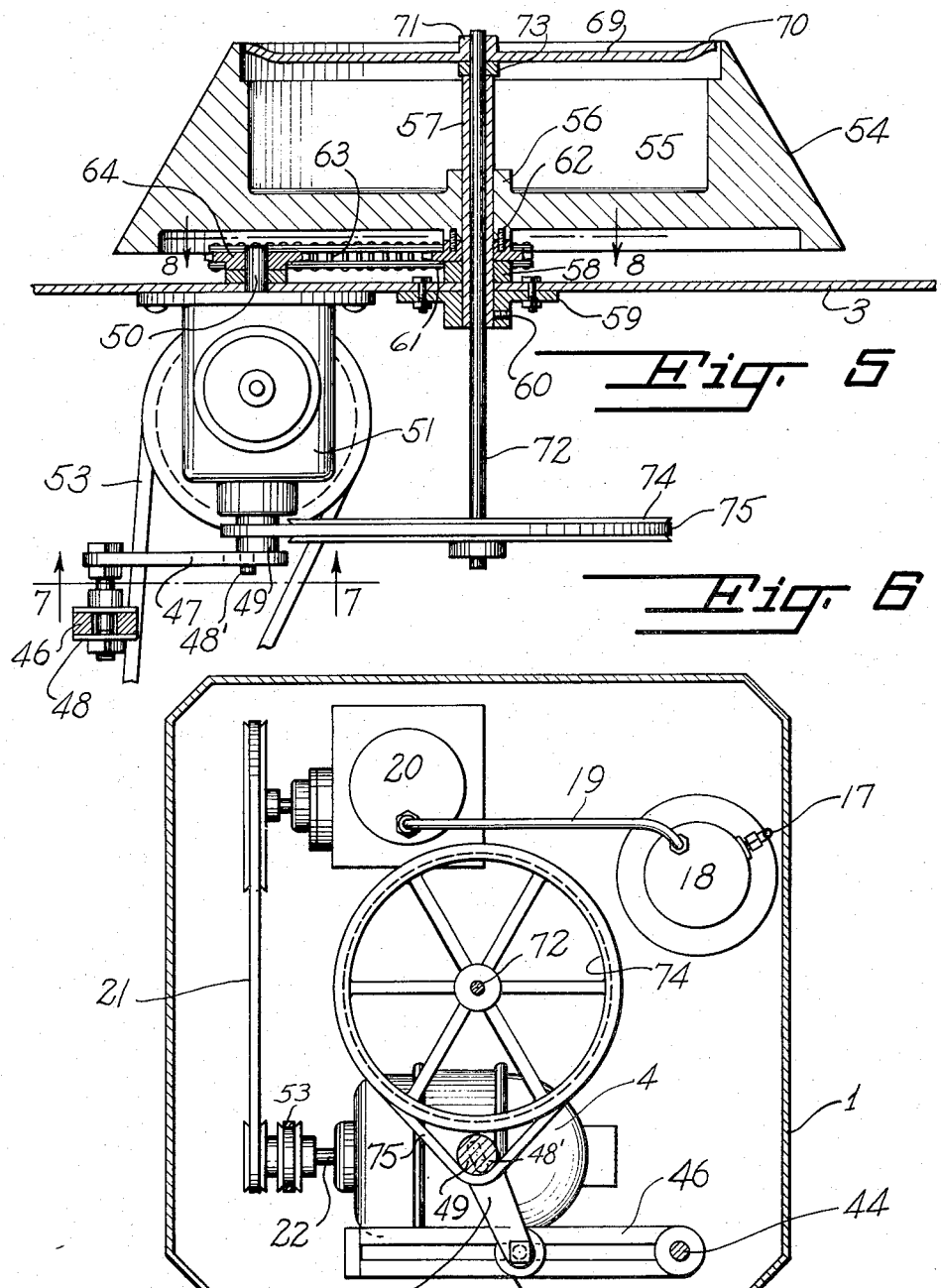

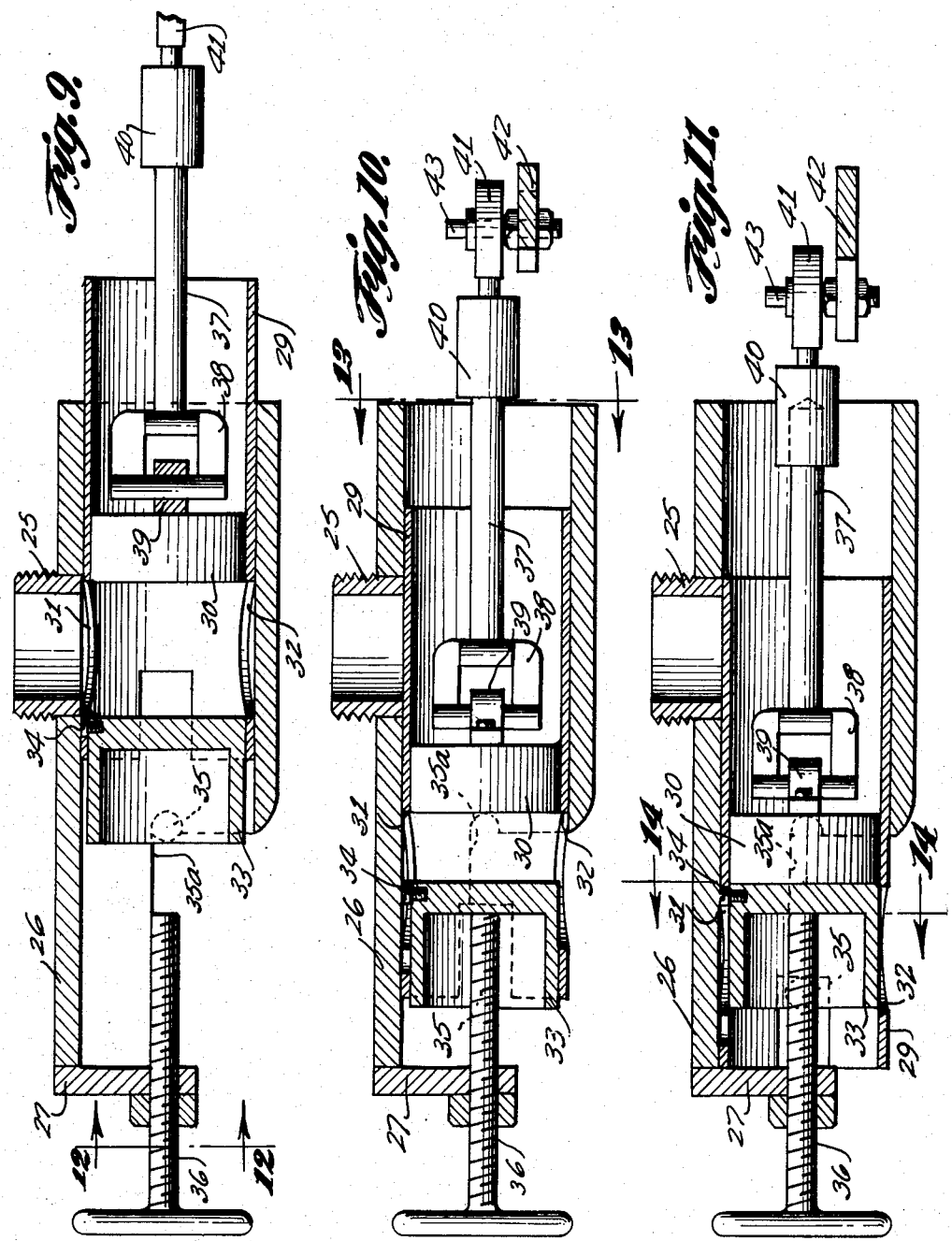

United States Patent Office 2,693,155
Patented Nov. 2, 1954

2,693,155
DOUGH DEPOSITOR FOR DOUGH ROUNDERS

Raymond Bay, Tulsa, Okla.

Application December 9, 1948, Serial No. 64,323

4 Claims. (Cl. 107—29)

My present invention relates to the general class of bread making appliances, and more specifically to an improved dough depositor for a dough rounder of the portable, self-contained, and motor operated type, which while well adapted for cutting and molding dough into various forms and shapes, is especially designed for molding buns and similar products of the bakery. In carrying out my invention I utilize air under pressure for feeding a batch of dough to a reciprocating and measuring divider, from which the measured lumps of dough are fed by gravity to a rounder or rolling mold device where the successive lumps are fashioned into rolls, buns and the like, and then delivered to a turn table or other receptacle from which they are afterward removed for further processing.

The machine of my invention includes a minimum number of parts that may be manufactured with facility at low cost of production, and the parts may be assembled with convenience to assure a quick acting machine that is durable, and reliable in the efficient performance of its functions.

The invention consists in certain novel features of construction and combinations and arrangements of parts as will hereinafter be described and more particularly set forth in the appended claims.

In the accompanying drawings I have illustrated a complete example of a physical embodiment of my invention wherein the parts are combined and arranged in accord with one mode I have devised for the practical application of the principles of the invention. It will, however be understood that changes and alterations are contemplated and may be made in these exemplifying drawings and structures, within the scope of my claims, without departing from the principles of the invention.

Figure 1 is a view in side elevation of a machine in which my invention is embodied, the cabinet being open to disclose the motor operated driving mechanism of the appliance.

Figure 2 is an enlarged perspective view of the machine on top of the cabinet.

Figure 3 is a top plan view of the machine.

Figure 4 is a sectional detail view at line 4—4 of Fig. 3.

Figure 5 is a sectional detail view at line 5—5 of Fig. 1 with parts shown in full.

Figure 6 is a horizontal sectional view through the cabinet or housing at line 6—6 of Fig. 1 disclosing some of the operating and driving parts of the machine.

Figure 7 is a detail sectional view at line 7—7 of Fig. 5.

Figure 8 is a sectional view at line 8—8 of Fig. 5.

Figures 9, 10, and 11 are respectively longitudinal sectional views of the reciprocating measuring divider, showing different positions of the plunger and cutter.

Figure 12 is a transverse sectional view at line 12—12 of Fig. 9;

Figure 13 is a similar view at line 13—13 of Fig. 10;

Figure 14 is a transverse sectional view at line 14—14 of Fig. 11.

In this preferred form of the invention, the portable appliance is mounted upon a cabinet 1, having rollers or wheels 2 and a top 3, in which an operating electric motor 4 is housed and provided with an extension cord or cable 5 that may be plugged in by a connector 6 to an outlet box for electrical power in operating the movable parts of the appliance.

A batch of dough is supplied to an elliptical feed hopper 7 having a lower tapered spout 8, and the hopper is supported in elevated position over the cabinet top 3 by an upright bracket arm 9 rigid with the supporting frame 10 mounted on the top 3. The air tight hopper is equipped with a flanged open top 11 and an inside lid 12 provided with a rubber sealing gasket 13, and is rigidly fastened to the hopper by means of an exterior clamp plate or arm 14 and a draw bolt 15 having an exterior head 16. By turning the draw bolt the lid or cover with its gasket is clamped against the inner side of the flanged top to form an air tight seal, and air under pressure is admitted to the interior of the hopper for feeding the dough from the hopper, and incidentally for aid in sealing the air tight cover or lid.

After the batch of dough has been supplied to the hopper and the lid clamped tight, air under suitable pressure is admitted to the top portion of the feeding chamber within the hopper by means of air pipe 17 extended upwardly from an air reservoir or tank 18 located within the cabinet; and the reservoir is supplied with air under pressure through a pipe 19 from a compressor 20 located in the cabinet and operated by a belt drive 21 from the shaft 22 of the electric motor 4, suitable control means being provided for the motor and the air supplying mechanism.

The lower end of the tapered spout of the hopper is provided with a discharge nozzle 23 for feeding the dough under air pressure, and the nozzle is coupled at 24 to an inlet bushing 25 of a horizontally disposed cylindrical housing 26 having one open end, while its other discharge end is half closed by means of an end plate 27 bolted thereto; and the housing is rigidly mounted by bracket 28 on the top of the cabinet.

The housing encloses a reciprocating cutting unit by means of which the dough is measured and severed into desired lumps as it is fed under air pressure from the hopper, and then the lumps, to form buns or other bakery products, are successively discharged under gravity from the divider, which includes an open end cylindrical slide sleeve 29.

The slide sleeve is equiped with an inner transversely arranged plunger head or piston head 30, preferably welded within the sleeve, and in front of the fixed head the sleeve is fashioned with an upper inlet port 31 for registration with the nipple inlet 25 to receive a quantity of dough, and with a lower diametrically arranged outlet port 32 for discharging the severed lump of dough.

In its front or forward end the slide sleeve carries a loosely mounted and relatively reciprocable and adjustable cup-shaped cutter head 33 having a retaining set screw 34 which prevents displacement of the cutter head, and a pair of diametrically opposed cap screws 35 that coact with ways 35a provided by the lower edges of the discharge end of the housing in the relative movement, back and forth of the cutter head.

The outward movement of the cutter head is limited by means of an adjustable abutment here shown as a screw bar 36 that is axially alined with the housing and sleeve and threaded in the head or end plate 27.

On the plunging stroke of the slide sleeve and head 30, the head 30 forces a lump of dough deposited from the hopper through the inlet port 31, which port is then closed by the sleeve, and the lump of dough is pushed against the movable cutter head carried by the sleeve until the cutter head strikes the end of the screw bar, as in Fig. 10. The slide sleeve continues its movement while the cutter head remains stationary and the plunger head 30 squeezes or forces the lump of dough through the outlet port 32, from where it drops by gravity to the rounder or rolling mold for the bun. During the movement the cutter head 33 remains fixed by engagement with the screw bar 36, thus the set screw 34 will move from the outer end of the lost motion slot in the sleeve 29 to a position in engagement with the edge of the port 31, Fig. 11. The lost motion slot communicates with the port 31 so that the port will be fully open as shown in Figs. 9 and 10.

On the return stroke of the plunger, nipple 25 being closed, port 31 registers with the nipple, port 32 is closed, and the cutter head is displaced from the position of Fig. 11 by engagement of the set screw 34 with the outer end of the lost motion slot in the sleeve 29 to assume the position shown in Fig. 9 to form the receiving chamber or dough receptacle between the spaced heads for a second operation.

The adjustable abutment or screw 36 regulates the distance the cutter head is forced back into the advancing slide sleeve, and therefore regulates and governs the quantity of dough in the measured lump.

For reciprocating the cutting or dividing unit, the plunger head 30 is equipped with a flexibly mounted connecting rod 37 having a coupling head 38 pivoted on a bearing 39 secured to the outer face of the head, and the outer end of the rod is threaded into a collar 40 to which is welded a horizontally disposed bearing disk 41. The free end of a horizontally disposed rocker arm 42 is pivoted at 43 on the bearing disk 41, and the inner end of the rocker arm is rigidly mounted on the upper end of an upright or vertical rock shaft 44 journaled in bearings 45 provided in bracket 28, and extended downwardly into the cabinet where it is also journaled in suitable bearings.

For oscillating or rocking the rock shaft, as best seen in Fig. 6, the shaft is provided with a horizontal and slotted lever arm 46 that is oscillated by means of a crank 47 having a slide bearing 48 on the slotted lever arm, and the inner end of the crank 47 is mounted upon an eccentric or crank pin 48' carried by a pulley 49 on the lower end of an upright gear shaft 50. The shaft 50 is journaled in bearings of a gear casing 51 mounted within the cabinet, and transmission gearing within the gear casing is operated from a horizontally disposed shaft 52 that is rotated by a belt drive 53 from the shaft 22 of the motor 4.

From the cutting unit, the lump of measured dough falls by gravity to the rounder or rolling mold which shapes or forms the lump into a bun, by means of a spinning head and turntable, and the shaped bun is removed for further processing.

The rolling mold mechanism includes a truncated conical spinning head 54 of hollow formation that is fashioned with integral spokes 55 radiating from a central hub 56 and located centrally of and above the cabinet, beneath the hopper, and in position to receive successive lumps of dough from the divider.

Within the hub 56 is rigidly mounted an upright tubular shaft 57 that is journaled in bearings 58 and extends down through the cabinet top which is provided with an interior bearing plate 59, and a set screw 60 prevents longitudinal displacement of this shaft.

For rotating the spinning head the lower face of the hub 56 rests upon a driven sprocket wheel 61 to which it is secured by sprocket pins 62, and the sprocket wheel 61 is driven by chain 63 from another sprocket wheel 64 mounted to revolve with the gear shaft 50.

The spinning head revolves within a stationary spirally arranged or helical flat wall or blade 65 that is mounted by brackets 66 on the top of the cabinet to form an elevating trough through which the bun is propelled by the spinning head. A measured lump of dough is deposited from the divider into the lower inlet end of the trough, as 67, at the wide base of the truncated spinning head where the maximum width of the trough occurs. By the spinning head the lump is propelled through the trough in contact with the inner face of the spiral blade, and the lump is gradually elevated by the blade to the discarge end 68 of the trough.

From the discharge end of the trough the properly shaped bun, or other product, is discharged upon a flat and dished turntable 69 having an upset annular retaining flange 70 and centrally located in the upper recessed opening of the hollow spinning head 54, from which turntable the buns are removed for panning.

The turntable is provided with a central hub 71 rigidly mounted on the upper end of an upright shaft 72 enclosed within the tubular shaft 57, and a spacing bearing 73 is mounted between the upper end of the tubular shaft and the turntable hub.

Shaft 72 projects below the lower end of the tubular shaft into the interior of the cabinet, and its lower end is equipped with a large pulley 74 driven by belt 75 from the smaller pulley 49 of the gear shaft 50 previously referred to. The spinning head and the turntable revolve in the same direction, but at different speeds, and their driving and transmission mechanisms are geared at approximately seventy-two revolutions per minute for the spinning head while the turntable turns at considerable lower speed of approximately six revolutions per minute. The spinning head in coaction with the rounding wall or blade is adapted to roll and mold, and simultaneously convey or elevate, a wide range of products varying from small to larger sizes as desired, and as measured by the cutting or dividing unit.

Having thus fully described my invention, what I claim as new and desire to secure by Letters Patent is:

1. In cutting mechanism for a dough rounder, the combination with a feed hopper having a discharge port and a housing having an inlet port, of a slide sleeve having inlet and outlet ports, said sleeve having a head fixed thereto at the rear of its ports, a connecting rod connected to said fixed head for reciprocating the sleeve in the housing, a relatively slidable cutter-head mounted in the sleeve and spaced from the fixed head, means on said slidable cutter head coacting with means in said slide sleeve to reciprocate said cutting head during the reciprocation of the sleeve, and an abutment supported by the housing in the path of the cutter head.

2. In cutting mechanism for a dough rounder, the combination with a feed hopper and means for admitting thereto air under pressure, and a housing having an inlet port, of a reciprocable sleeve adapted to close said port, said sleeve having an inlet port and a diametrically oppositely arranged outlet port, a head in the sleeve and fixed thereto back of its ports and a connecting rod connected to said head for reciprocating the sleeve, a relatively reciprocable cutter head mounted in the sleeve in spaced relation to the fixed head, means on said slidable cutter head coacting with means in said slide sleeve to reciprocate said cutting head during the reciprocation of the sleeve, and an abutment supported by the housing in the path of the cutter head.

3. In cutting mechanism for a dough rounder, the combination with a housing having an inlet port, and a reciprocable sleeve having an inlet port and an outlet port, of a head in the sleeve fixed thereto and operating mechanism connected to the head, a relatively reciprocable cutter head mounted in the sleeve for coaction with the ports and fixed head, a connecting rod connected to said fixed head for reciprocating said fixed head and sleeve and a screw bar mounted in the housing forming an abutment in the path of the cutter head.

4. In cutting mechanism for a dough rounder, the combination with a housing having an inlet port, and a reciprocable sleeve having an inlet port and an outlet port, of a head in the sleeve and fixed thereto at the rear of the sleeve ports and operating means connected to said head, a relatively reciprocable cup-shaped cutter head mounted in the sleeve, coacting means on the cutter head and housing for guiding the relative movement of the cutter head, a connecting rod connected to said fixed head for reciprocating said fixed head and sleeve and a screw bar mounted in the housing forming an adjustable abutment in the path of the cutter head.

References Cited in the file of this patent

UNITED STATES PATENTS

| Number | Name | Date |
|---|---|---|
| 854,308 | Petri | May 21, 1907 |
| 967,700 | Aldred et al. | Aug. 16, 1910 |
| 1,171,330 | Embrey | Feb. 8, 1916 |
| 1,880,753 | Brand | Oct. 4, 1932 |
| 1,931,975 | Berzon | Oct. 24, 1933 |
| 2,004,161 | Fausel | June 11, 1935 |
| 2,187,214 | Rhodes | Jan. 16, 1940 |